US012566999B1

(12) United States Patent
Busey et al.

(10) Patent No.: US 12,566,999 B1
(45) Date of Patent: Mar. 3, 2026

(54) SYSTEMS AND METHODS FOR TRAINING A MACHINE LEARNING MODEL TO DETERMINE CONFIDENCE VALUES FOR POTENTIAL WORKFLOW OUTPUTS GENERATED BY A COMPUTATIONAL WORKFLOW

(71) Applicant: Form Bio Inc., Austin, TX (US)

(72) Inventors: Andrew Busey, Austin, TX (US);
Brandi Lynn Cantarel, Richardson, TX (US); Douglas James Daniels, Jr., Austin, TX (US); Joseph Charles Nipko, Boulder City, NV (US)

(73) Assignee: Form Bio Inc., Austin, TX (US)

( * ) Notice: Subject to any disclaimer, the term of this patent is extended or adjusted under 35 U.S.C. 154(b) by 806 days.

(21) Appl. No.: 17/883,124

(22) Filed: Aug. 8, 2022

(51) Int. Cl.
*G06N 20/00* (2019.01)

(52) U.S. Cl.
CPC ..................................... *G06N 20/00* (2019.01)

(58) Field of Classification Search
None
See application file for complete search history.

(56) References Cited

U.S. PATENT DOCUMENTS

| | | | |
|---|---|---|---|
| 2004/0143403 A1 | 7/2004 | Brandon | |
| 2006/0064415 A1 | 3/2006 | Guyon | |
| 2008/0307194 A1 | 12/2008 | Archer | |
| 2008/0307195 A1 | 12/2008 | Archer | |
| 2014/0325587 A1 | 10/2014 | Nilsson | |
| 2016/0034809 A1 | 2/2016 | Trenholm | |
| 2017/0046481 A1* | 2/2017 | Wang | ...... G16B 50/10 |
| 2018/0189444 A1 | 7/2018 | Van Rooyen | |
| 2019/0196672 A1 | 6/2019 | Mikheev | |
| 2020/0004604 A1 | 1/2020 | Lavoie | |
| 2020/0176084 A1 | 6/2020 | Fitch | |
| 2020/0184376 A1 | 6/2020 | Parameswaran | |
| 2021/0256394 A1* | 8/2021 | Tymoshenko | ......... G06N 3/123 |
| 2021/0257056 A1* | 8/2021 | Liu | ......... G16B 35/10 |
| 2021/0280275 A1* | 9/2021 | Akerman | ............ G16B 40/20 |
| 2022/0137978 A1 | 5/2022 | Sodagar | |
| 2022/0243257 A1 | 8/2022 | Kwok | |
| 2023/0114581 A1 | 4/2023 | Bell | |
| 2024/0353825 A1* | 10/2024 | Thiruvenkatanathan | .................... G05B 23/0229 |
| 2024/0354607 A1 | 10/2024 | Wong | |

* cited by examiner

*Primary Examiner* — Xuyang Xia
(74) *Attorney, Agent, or Firm* — Esplin & Associates, PC

(57) ABSTRACT

System and method for training a machine learning model to determine confidence values for potential workflow outputs generated by a computational workflow and/or determining confidence values for potential workflow outputs using a trained machine learning model. Exemplary implementations may: store a workflow definition defining a computational workflow, computational modules, final workflow outputs, sets of potential workflow outputs, and/or other information; obtain the sets of potential workflow outputs and final workflow outputs for multiple ones of the input information sets; compile the sets of potential workflow outputs and final workflow outputs into input/output pairs for the corresponding input information sets; train a machine learning model based on the input/output pairs for the multiple input information sets to generate a trained machine learning model and/or other information; and/or other exemplary implementations.

8 Claims, 5 Drawing Sheets

100

Server(s) 102

Electronic Storage 128

Processor(s) 130

Machine-Readable Instructions 106

Machine Learning Component 108

Input Component 110

Workflow Component 112

Model Component 114

116

Client Computing Platform(s) 104

External Resources 126

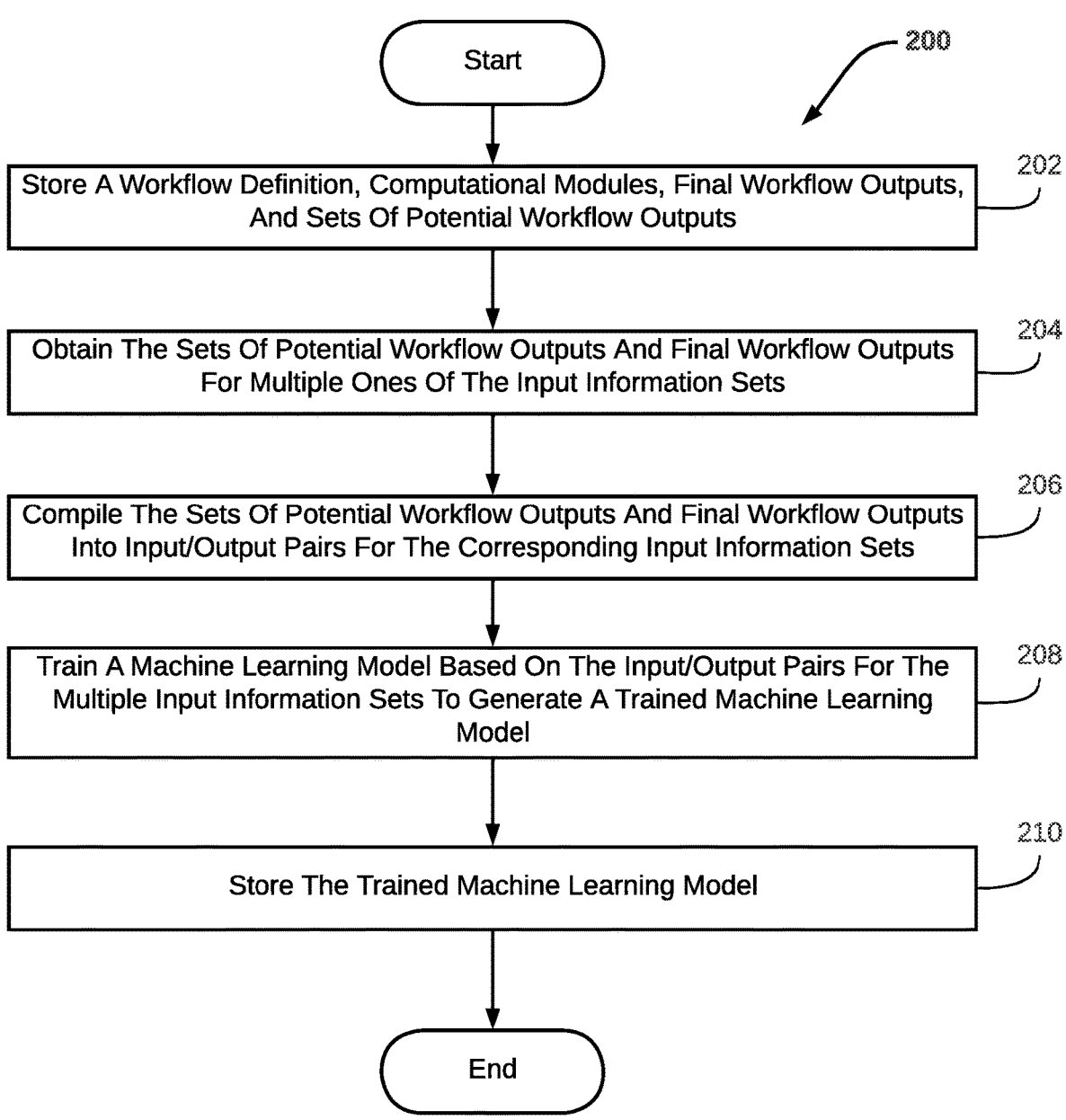

Start

200

Store A Workflow Definition, Computational Modules, Final Workflow Outputs, And Sets Of Potential Workflow Outputs                    202

Obtain The Sets Of Potential Workflow Outputs And Final Workflow Outputs For Multiple Ones Of The Input Information Sets                    204

Compile The Sets Of Potential Workflow Outputs And Final Workflow Outputs Into Input/Output Pairs For The Corresponding Input Information Sets                    206

Train A Machine Learning Model Based On The Input/Output Pairs For The Multiple Input Information Sets To Generate A Trained Machine Learning Model                    208

Store The Trained Machine Learning Model                    210

End

FIG. 2

SYSTEMS AND METHODS FOR TRAINING A MACHINE LEARNING MODEL TO DETERMINE CONFIDENCE VALUES FOR POTENTIAL WORKFLOW OUTPUTS GENERATED BY A COMPUTATIONAL WORKFLOW

FIELD OF THE DISCLOSURE

The present disclosure relates to systems and methods for training a machine learning model to determine confidence values for potential workflow outputs generated by a computational workflow and use of the trained machine learning model.

BACKGROUND

Methods of processing data in parallel are known (e.g., parallel computing using multiple processors). Bioinformatics programs for converting between file types and/or formats are known.

SUMMARY

Attempting to convert biological data (e.g., genomic information) between formats and/or file types may result in numerous and varying sets of outputs. One or more computational modules (i.e., bioinformatics programs) used to process and/or convert input sets of biological data (e.g., a marker of interest including DNA and RNA sequences, mass spectrometry, biological image data from microscopy, MRI, CT, radiology, etc.) may be configured in a computational workflow in order to achieve a desired output. The computational workflow may include connected workflow stages having a number of computational modules for processing input. Individual outputs of a previous workflow stage may be provided as input into individual computational modules of a subsequent workflow stage, resulting in an exponential number of outputs for the computational workflow. It may be inefficient or infeasible for a user to manually evaluate and/or analyze each output from the computational workflow, therefore one or more aspects disclosed herein propose solutions for utilizing a machine learning model to determine confidence values for individual ones of the outputs. User(s) may use the confidence values to sort the outputs, rank the outputs, select final output, and/or other actions.

One or more aspects of the present disclosure include a system for training a machine learning model to determine confidence values for potential workflow outputs generated by a computational workflow. One or more aspects of the present disclosure include a system for utilizing a trained machine learning model to determine confidence values for potential workflow outputs generated by a computational workflow. The system may include electronic storage, one or more hardware processors configured by machine-readable instructions and/or other components. Executing the machine-readable instructions may cause the one or more hardware processors to facilitate training a machine learning model to determine confidence values for potential workflow outputs generated by a computational workflow and/or determining confidence values for potential workflow outputs generated by a computational workflow. The machine-readable instructions may include one or more computer program components. The one or more computer program components may include one or more of a machine learning component, input component, workflow component, model component, and/or other components.

The electronic storage may be configured to store a workflow definition defining a computational workflow, computational modules, final workflow outputs, sets of potential workflow outputs, and/or other information. The workflow definition may specify a relative order of computational modules and/or sets of computational modules to configure the computational workflow. The computational modules may define separate sets of operations to perform on module inputs to the computational modules to generate module outputs. An individual set of potential workflow outputs may be generated by processing an input information set in accordance with the workflow definition. An individual final workflow output may be selected from the individual set of potential workflow outputs. By way of non-limiting illustration, a given final workflow output for a given input information set may be selected from a given set of potential workflow outputs for the given input information set.

The machine learning component may be configured to obtain the sets of potential workflow outputs and final workflow outputs for multiple ones of the input information sets from electronic storage. By way of non-limiting illustration, the given set of potential workflow outputs and the given final workflow output for the given input information set may be obtained.

The machine learning component may be configured to compile the sets of potential workflow outputs and final workflow outputs into input/output pairs for the corresponding input information sets. The input/output pairs may include training input information, training output information, and/or other information. The training input information for the given input information set may include the given set of potential workflow outputs and/or other information. The training output information for the given input information set may include the given final workflow output selected from given set of potential workflow outputs and/or other information.

The machine learning component may be configured to train a machine learning model based on the input/output pairs for the multiple input information sets to generate a trained machine learning model and/or other information. The trained machine learning model may be configured to determine confidence values that represent likelihoods that the individual potential workflow outputs are the final workflow outputs. By way of non-limiting illustration, the machine learning model may be trained using the first input/output pair.

The machine learning component may be configured to store the trained machine learning model in electronic storage.

The input component may be configured to obtain the workflow definition and computational modules from electronic storage.

The input component may be configured to configure the computational workflow based on the workflow definition. The computational workflow may have a first workflow stage and a second workflow stage that is subsequent to the first workflow stage. The first workflow stage may correspond to a first set of computational modules and the second workflow stage may correspond to a second set of computational modules.

The input component may be configured to obtain a first input information set to be processed by the computational workflow.

The workflow component may be configured to process the first input information set in accordance with the workflow definition to generate a first set of potential workflow outputs for the first input information set. At the first workflow stage, the first input information set may be provided as module input to individual ones of the computational modules of the first set of computational modules to generate a first set of module outputs. The first set of module outputs may include multiple module outputs generated by the individual computational modules of the first set of computational modules. At the second workflow stage, individual ones of the module outputs of the first set of module outputs may be provided as module inputs to individual ones of the computational modules of the second set of computational modules to generate a second set of module outputs. The second set of module outputs may include multiple module outputs generated by the individual computational modules of the second set of computational modules. The first set of potential workflow outputs may include the second set of module outputs and/or information derived thereof.

The model component may be configured to obtain the trained machine learning model from electronic storage.

The model component may be configured to provide the first set of potential workflow outputs for the first input information set as input into the trained machine learning model.

The model component may be configured to obtain output from the trained machine learning model. Output from the trained machine learning model may include confidence values for individual potential workflow outputs of the first set of potential workflow outputs, and/or other information. The confidence values may represent likelihoods that the individual potential workflow outputs are the final workflow outputs for the first input information set.

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 2 illustrates a method for training a machine learning model to determine confidence values for potential workflow outputs generated by a computational workflow, in accordance with one or more implementations.

DETAILED DESCRIPTION

Figure 1:
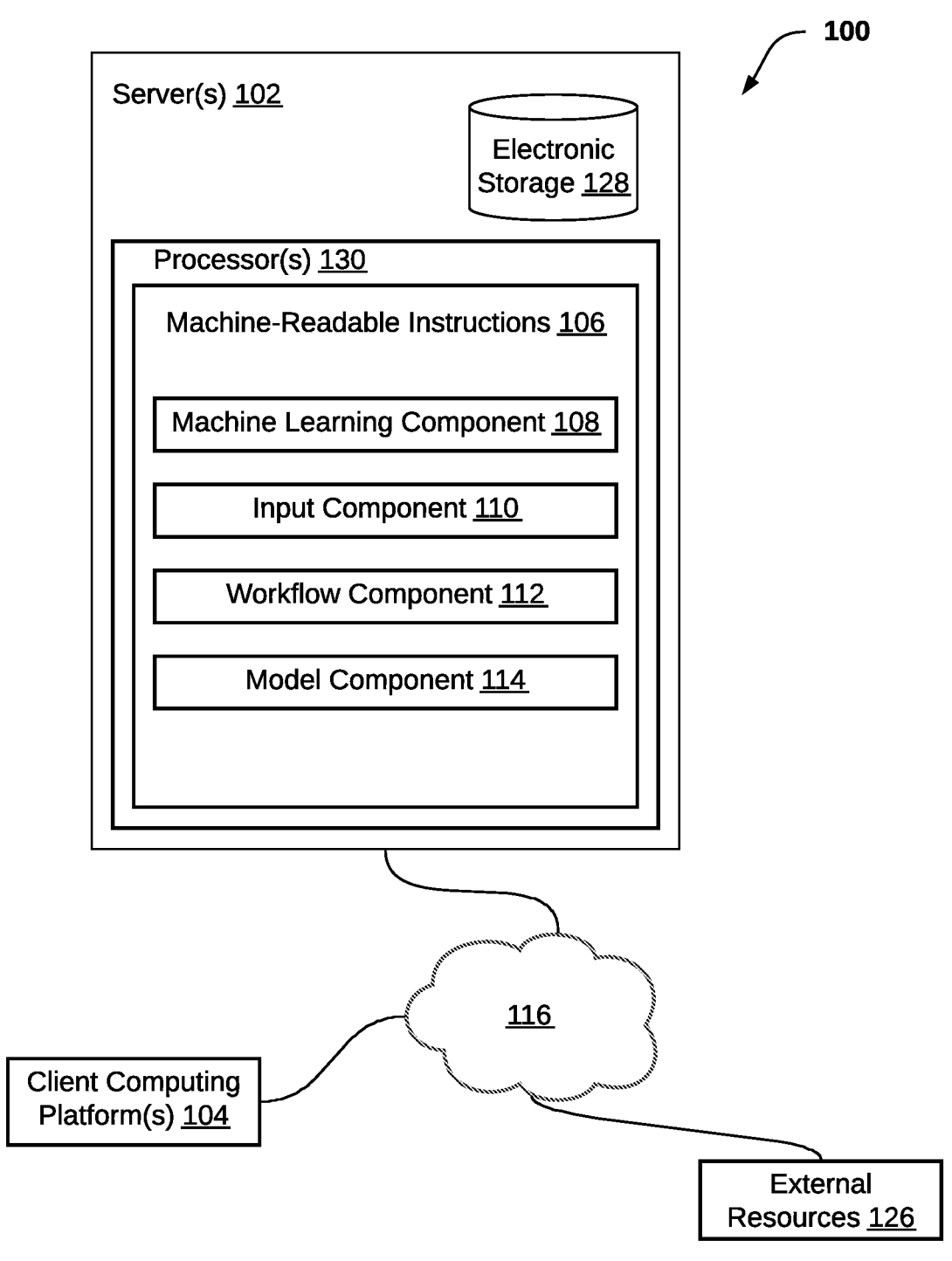
FIG. 1 illustrates a system for training a machine learning model to determine confidence values for potential workflow outputs generated by a computational workflow and/or determining confidence values for potential workflow outputs using a trained machine learning model, in accordance with one or more implementations.

FIG. 1 illustrates a system 100 configured for training a machine learning model to determine confidence values for potential workflow outputs generated by a computational workflow and/or determining confidence values for potential workflow outputs using a trained machine learning model, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of machine learning component 108, input component 110, workflow component 112, model component 114, and/or other instruction components.

Electronic storage 128 may be configured to store a workflow definition defining a computational workflow, computational modules, final workflow outputs, sets of potential workflow outputs, and/or other information. The workflow definition may specify a relative order of computational modules and/or sets of computational modules to configure the computational workflow. The computational modules may define separate sets of operations to perform on module inputs to the computational modules to generate module outputs. An individual set of potential workflow outputs may be generated by processing an input information set in accordance with the workflow definition. An individual final workflow output may be selected from the individual set of potential workflow outputs for the input information set.

By way of non-limiting illustration, a given final workflow output for a given input information set may be selected from a given set of potential workflow outputs for the given input information set. In some implementations, user input from a client computing platform 104 associated with a user may specify selection of the given final workflow output from the given set of potential workflow outputs.

In some implementations, the workflow definition may specify a first set of computational modules followed by a second set of computational modules within the computational workflow. In some implementations, computational modules of a set of computational modules may be functionally analogous. Computational modules that are functionally analogous may produce outputs having the same output format, and/or outputs that share other characteristics. Computational modules that are functionally analogous may define separate sets of computational operations that perform the same calculations in a different order, perform the same functions using different calculations, and/or other variations. By way of non-limiting illustration, the computational modules included in the first set of computational modules may be functionally analogous. The computational modules included in the second set of computational modules may be functionally analogous.

In some implementations, module outputs generated by computational modules that are functionally analogous may also be functionally analogous. By way of non-limiting illustration, a first module output may include a first genomic sequence. The first module output may be generated by a first computational module. A second module output may include a second genomic sequence. The second module output may be generated by a second computational module. The first genomic sequence and the second genomic sequence may be functionally analogous by virtue of the first computational module and the second computational module being functionally analogous. The first genomic sequence and the second genomic sequence being functionally analogous may indicate the first genomic sequence and the second genomic sequence result in production of the same compounds during a manufacturing process (e.g., protein synthesis).

In some implementations, computational modules may have different input format requirements for module inputs. Module inputs that do not satisfy the input format requirements of a computational module may not be capable of being processed by the computational module. Input format requirements may specify a required file format (e.g., FASTQ, FASTA, BAM, etc.), a required data format, required file information (e.g., indexing information, quality score information, etc.), and/or other requirements. The separate sets of computational operations defined by the different computational modules may generate module outputs having different module output formats. In some implementations, the computational module may be configured to convert the module input from the input format to the module output format. A module input to a computational module may include the same or similar information in a different format (i.e. data format, file format, etc.) as the module output generated by the computational module. By way of non-limiting example, a computational module may define separate sets of computational operations for converting an input file of a BAN format to produce an output of a FASTA format. In some implementations, the computational modules of a set of computational modules may have the same input format requirements and/or generate module outputs having the same module output format.

Machine learning component 108 may be configured to obtain the sets of potential workflow outputs and final workflow outputs for multiple ones of the input information sets from electronic storage. An individual set of potential workflow outputs may include one or more final workflow outputs. An individual set of potential workflow outputs may correspond to an individual input information set. The input information set may have been processed in accordance with the workflow definition to generate the set of potential workflow outputs. In some implementations, the set of potential workflow outputs may include 10 potential workflow outputs, 100 potential workflow outputs, 10,000 potential workflow outputs, and/or other numbers of potential workflow outputs. By way of non-limiting illustration, the given set of potential workflow outputs and the given final workflow output for the given input information set may be obtained.

Machine learning component 108 may compile the sets of potential workflow outputs and final workflow outputs into input/output pairs for the corresponding input information sets. The input/output pairs may contain first input/output pair and/or other input/output pairs. The first input/output pair may include training input information, training output information, and/or other information. The training input information for the given input information set may include the given set of potential workflow outputs and/or other information. The training output information for the given input information set may include the given final workflow output selected from the given set of potential workflow outputs and/or other information.

Machine learning component 108 may be configured to train a machine learning model based on the input/output pairs for the multiple input information sets to generate a trained machine learning model and/or other information. The trained machine learning model may be configured to determine confidence values that represent likelihoods that the individual potential workflow outputs are the final workflow outputs. By way of non-limiting illustration, the machine learning model may be trained using the first input/output pair. Machine learning component 108 may be configured to store the trained machine learning model in electronic storage 128.

In some implementations, the machine learning model may utilize one or more of an artificial neural network, naïve bayes classifier algorithm, k-means clustering algorithm, support vector machine algorithm, linear regression, logistic regression, decision trees, random forest, nearest neighbors, and/or other approaches. Machine learning component 108 may utilize training techniques such as supervised learning, semi-supervised learning, unsupervised learning, reinforcement learning, and/or other techniques.

In supervised learning, the model may be provided with a known training dataset that includes desired inputs and outputs (e.g., the input/output pairs described herein), and the model may be configured to find a method to determine how to arrive at those outputs based on the inputs. The model may identify patterns in data, learn from observations, and make predictions. The model may make predictions and may be corrected by an operator—this process may continue until the model achieves a high level of accuracy/performance. Supervised learning may utilize approaches including one or more of classification, regression, and/or forecasting.

Semi-supervised learning may be similar to supervised learning, but instead uses both labelled and unlabeled data. Labelled data may comprise information that has meaningful tags so that the model can understand the data (e.g., the input/output pairs described herein), while unlabeled data may lack that information. By using this combination, the machine learning model may learn to label unlabeled data.

For unsupervised learning, the machine learning model may study data to identify patterns. There may be no answer key or human operator to provide instruction. Instead, the model may determine the correlations and relationships by analyzing available data. In an unsupervised learning process, the machine learning model may be left to interpret large data sets and address that data accordingly. The model tries to organize that data in some way to describe its structure. This might mean grouping the data into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values. By defining the rules, the machine learning model then tries to explore different options and possibilities, monitoring and evaluating each result to determine which one is optimal to generate correspondences. Reinforcement learning teaches the model of trial and error. The model may learn from past experiences and adapt its approach in response to the situation to achieve the best possible result.

In some implementations, confidence value may be a numerical value, an alphanumerical value, a percentage, a score (e.g., out of 15), and/or other types of values. In some implementations, a relatively higher confidence value may indicate that the potential workflow output is more likely to be the final workflow output for the corresponding input information set. Confidence values may include labels (e.g., low, moderate, high, etc.) that indicate the probability that the individual potential workflow output is the final work-flow output. Confidence values may include a rank. By way of non-limiting illustration, the individual potential work-flow output ranked first may have the highest probability of being the final workflow output.

In some implementations, machine learning component 108 may be configured to analyze the individual potential workflow outputs. Analyzing potential workflow outputs may include determining scores (e.g., numerical values) for individual features (i.e., properties, characteristics, traits), instances of phenomena present in the separate sets of analogous output information, and/or other information. Scores may be numerical values, Boolean values, string values, and/or other types of values. Scores for features may include a quality score, an accuracy score, a precision score, and/or other information. In some implementations, the machine learning model may be trained to determine confidence values based on the determined scores.

Input component 110 may be configured to obtain the workflow definition and computational modules from electronic storage. Input component 110 may be configured to configure the computational workflow based on the workflow definition. The computational workflow may include one or more of a first workflow stage, a second workflow stage, and/or other workflow stages. The first workflow stage may correspond to the first set of computational modules. The second workflow stage may correspond to the second set of computational modules. The order of the workflow stages may be determined by the relative order of computational modules and/or sets of computational modules specified by the workflow definition. By way of non-limiting illustration, the second workflow stage may be subsequent to the first workflow stage, responsive to the workflow definition specifying the second set of computational modules is subsequent to the first set of computational modules. Based on the order of the workflow stages, the input information set may be processed by the computational modules corresponding to the second workflow stage subsequent to the input information set being processed by the computational modules corresponding to the first work-flow stage. In some implementations, the order of workflow stages may determine input/output connections between workflow stages. For example, the second workflow stage being subsequent to the first workflow stage may indicate outputs of the first workflow stage (and/or information derived from the outputs of the first workflow stage) to be provided as input to the second workflow stage.

Input component 110 may be configured to obtain a first input information set to be processed by the computational workflow. In some implementations, the first input information set may be obtained via user entry and/or selection of an input information set and/or other information. User entry may include a user uploading one or more electronic files via one or more client computing platform(s) 104 associated with the user. The one or more electronic files may include genomic information (e.g., representations of nucleotide sequences and/or information related to the nucleotide sequences) and/or other information. The one or more electronic files be a FASTA file, FASTQ file, BAM file, SAM file, BAS file, and/or other file types. The first input information set may include indexing information, quality score information, and/or other information pertaining to the genomic information included in the first input information set. In some implementations, the first input information set may be obtained from an external database via one or more network(s) 116. Input information sets obtained from an external database may be reconfigured (i.e., reformatted) by input component 110 in order to facilitate compatibility with system 100. In some implementations, the user may select the first input information set from multiple provided input information sets. By way of non-limiting example, the user may access a user interface via client computing platform(s) 104. The user interface may show one or more user interface elements associated with one or more individual input information sets capable of being selected. The user inter-face elements may include drop-down menus, widgets, buttons, tabs, and/or other types of user interface elements. Selection and/or entry of the first input information set may facilitate processing of the first input information set in accordance with the workflow definition.

In some implementations, input component 110 may be configured to receive user input indicating preference information associated with the final workflow output, computational workflow, and/or other information. Preference information may define criteria to be satisfied for the final workflow outputs of the computational workflow. For example, potential workflow outputs of the computational workflow that satisfy the criteria of the preference information may be provided to the user as final workflow output. Potential workflow outputs that do not satisfy the criteria of the preference information may not be provided to the user as final workflow output and/or flagged for failure to satisfy the criteria. Criteria may include one or more thresholds for values and/or features associated with the potential work-flow outputs of the computational workflow. For example, criteria may include a threshold for a quality score (i.e., a confidence score) associated with a potential workflow output of the computational workflow.

Workflow component 112 may be configured to process the first input information set in accordance with the work-flow definition to generate a first set of potential workflow outputs for the first input information set. Processing may include performing the separate sets of operations defined by computational modules in an order that is in accordance with the workflow definition. Performing an individual set of computational operations on a module input may include transforming, converting, reformatting, and/or performing other modifications to the module input to generate a module output. In some implementations, the first set of computational modules may include a first computational module and a second computational module. The second set of computational modules may include a third computational modules and a fourth computational module.

At the first workflow stage, the first input information set may be provided as module input to individual ones of the computational modules of the first set of computational modules to generate a first set of module outputs. The first input information set and/or information derived thereof may be provided as module input to the first computational module and the second computational module. The module input to the first computational module may be the same as the module input to the second computational module. A first set of operations defined by the first computational module may be performed on the module input to produce a first module output and/or other outputs. A second set of operations defined by the second computational module may be performed on the module input to produce a second module output and/or other outputs. The first module output and the second module output may have the same output format and/or share other characteristics.

The first set of module outputs may include the first module output generated by the first computational module, the second module output generated by the second computational module, and/or other module outputs generated by other computational modules of the first set of computational modules. Performing the first set of operations on the module input and performing the second set of operations on the module input may happen simultaneously or near simultaneously. In other words, the first module output and the second module output may be generated simultaneously or near simultaneously.

In some implementations, the second workflow stage may be initiated responsive to completion of processing of the input information set (and/or information derived thereof) at the first workflow stage, generation of the first set of module outputs and/or other events. At the second workflow stage, workflow component 112 may be configured to process the first set of module outputs to generate a second set of module outputs. Information derived from the first set of module outputs may be generated by modifying the first module output and/or the second module output to satisfy the input format requirements for module inputs of the second set of computational modules. In some implementations, the information derived from the first set of module outputs may be generated by aggregating the first module output and/or the second module output to produce module input for computational modules of the second set of computational modules.

At the second workflow stage, individual ones of the module outputs of the first set of module outputs may be provided as module inputs to individual ones of the computational modules of the second set of computational modules to generate a second set of module outputs. The first module output and/or information derived thereof may be provided as module input to the third computational module and the fourth computational module. A third set of computational operations defined by the third computational module may be performed on the module input (i.e., the first module output and/or information derived from the first module output) to generate a third module output and/or other outputs. A fourth set of computational operations defined by the fourth computational module may be performed on the module input (i.e., the first module output and/or information derived from the first module output) to generate a fourth module output and/or other outputs. At the second workflow stage, the second module output may be provided as module input to the third computational module and the fourth computational module. The third set of computational operations may be performed on the module input (i.e., the second module output and/or information derived from the second module output) to produce a fifth module output and/or other outputs. The fourth set of computational operations may be performed on the module input (i.e., the second module output and/or information derived from the second module output) to produce a sixth module output and/or other outputs. In some implementations, performing one or more of the third set of computational operations on the first module output, the fourth set of computational operations on the first module output, the third set of computational operations on the second module output, and/or the fourth set of computational operations on the second module output may happen simultaneously or near simultaneously. In other words, one or more of the third module output, fourth module output, fifth module output, and/or sixth module output may be generated simultaneously and/or near simultaneously.

The second set of module outputs may include the third module output, fourth module output, fifth module output, sixth module output, and/or other outputs. The third module output, fourth module output, fifth module output, and/or sixth module output may be functionally analogous and/or share other characteristics. In some implementations, the second set of module outputs may be provided as module input for a third set of computational modules corresponding to a third workflow stage and/or exported as a second input information set for another computational workflow.

The first set of potential workflow outputs for the first input information set may include module outputs included in the second set of module outputs and/or information derived thereof. The first set of potential workflow outputs may include separate sets of analogous workflow output, and/or other information. The separate sets of analogous workflow output may reflect the parallel (i.e., simultaneous) nature of computation provided by the computational workflow. For example, individual computational modules of a set of computational modules corresponding to a workflow stage may perform sets of operations for multiple module inputs in parallel. By way of non-limiting illustration, the first set of module outputs may include separate analogous outputs that reflect the parallel nature of computation provided by the computational workflow, and the second set of module outputs may include separate analogous outputs that similarly reflect the parallel nature of computation provided by the computational workflow Model component 114 may be configured to obtain the trained machine learning model from electronic storage. Model component 114 may be configured to provide the first set of potential workflow outputs for the first input information set as input into the trained machine learning model.

Model component 114 may be configured to obtain output from the trained machine learning model. Output from the trained machine learning model may include confidence values for individual potential workflow outputs of the first set of potential workflow outputs, and/or other information. The confidence values may represent likelihoods that the individual potential workflow outputs are the final workflow outputs for the first input information set.

In some implementations, model component 114 may be configured to store the obtained output from the trained machine learning model in electronic storage 128. The obtained output may be stored in association with at least one of the first input information set, the first set of potential workflow outputs, and/or the workflow definition.

In some implementations, model component 114 may be configured to present, via a user interface, a graphical summary characterizing the individual confidence values for individual potential workflow outputs of the first set of potential workflow outputs for the first input information set. In some implementations, the graphical summary may present the potential workflow outputs of the first set of potential workflow outputs in an ordered list. The ordered list may be based on the confidence values determined for the first set of potential workflow outputs. The graphical summary may include a line graph, a plot graph (i.e., scatterplot), and/or other types of graphical summaries. In some implementations, input component 110 may be configured to receive user input specifying one or more components of the graphical summary. Components of the graphical summary may include type of graphical summary, number of axes, values represented by axes, ranges of values, and/or other components.

In some implementations, the first set of potential workflow outputs may be presented to the user in a list, graph, and/or other type of visual summary. The visual summary of the first set of potential workflow outputs may include individual visual elements corresponding to individual ones of the potential workflow outputs and/or be capable of being selected. Selection of one or more of the potential workflow outputs included in the visual summary may facilitate providing the selected one(s) of the potential workflow outputs as the first final workflow output for the first input information set. The first final workflow output may be exported and/or otherwise used by the user. Input component 110 may be configured to receive user input specifying selection of one or more of the potential workflow outputs of the first set of potential workflow outputs and/or other types of user input.

In some implementations, input component 110 may be configured to receive user input indicating selection of at least one of the potential workflow outputs of the first set of potential workflow outputs. The selected potential workflow output may be provided as the first final workflow output for the first input information set.

Figure 4:
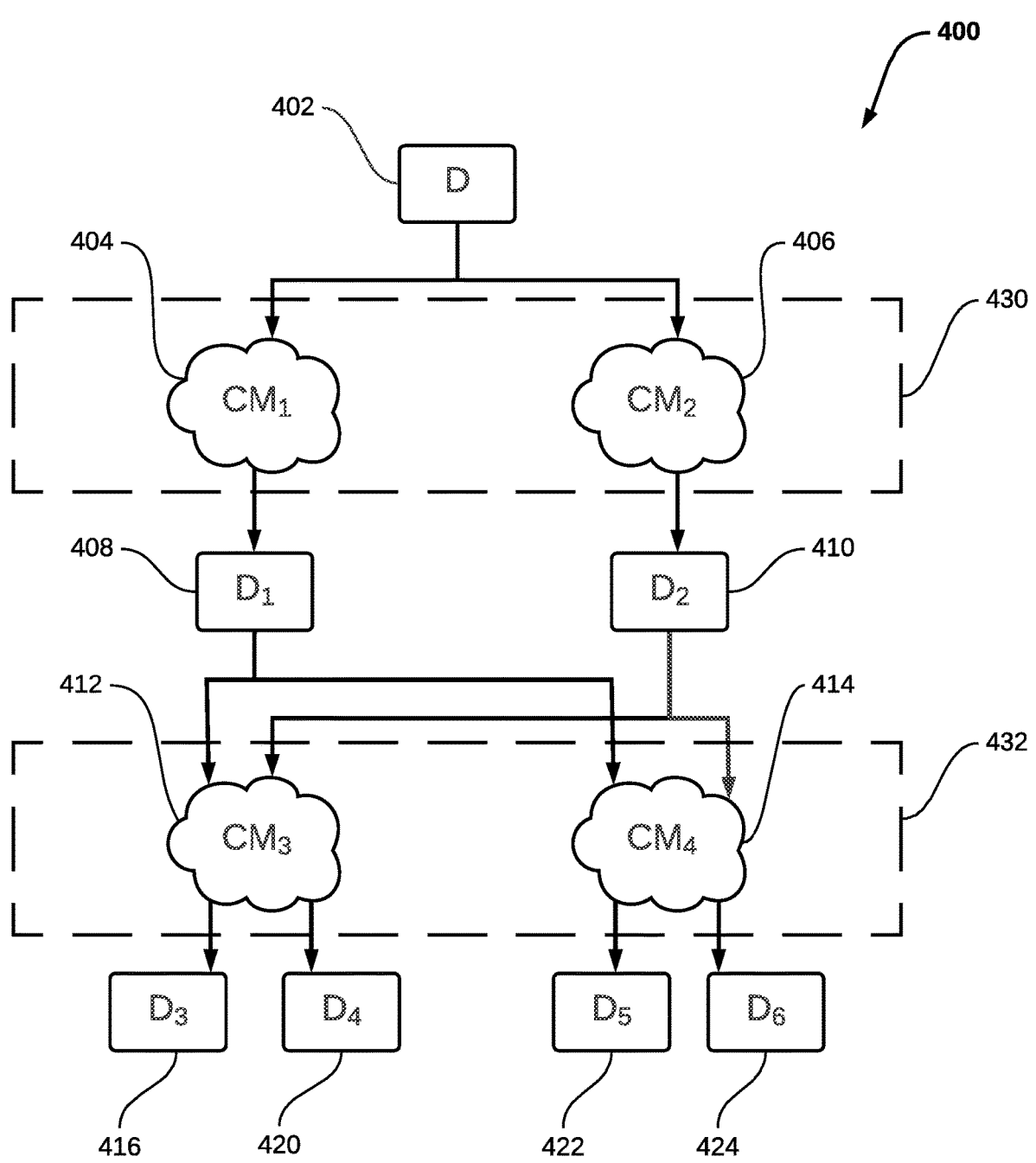
FIG. 4, illustrates an exemplary implementation of the system configured for training a machine learning model to determine confidence values for potential workflow outputs generated by a computational workflow and/or determining confidence values for potential workflow outputs using a trained machine learning model, in accordance with one or more implementations.

FIG. 4 illustrates an exemplary implementation of a system configured for training a machine learning model to determine confidence values for potential workflow outputs generated by a computational workflow and/or determining confidence values for potential workflow outputs using a trained machine learning model, in accordance with one or more implementations. The computational workflow may include a first workflow stage 430 (represented by a dashed rectangle), a second workflow stage 432 (represented by a dashed rectangle), and/or other workflow stages. The second workflow stage 432 may be subsequent to the first workflow stage 430. The first workflow stage 430 may include one or more of a first computational module 404, a second computational module 406, and/or other computational modules. In some implementations first computational module 404 and second computational module 406 may have the same input format requirement(s). First computational module 404 may define a first set of operations to be performed on input to first computational module 404. Second computational module 406 may define a second set of operations to be performed on input to second computational module 406. The second workflow stage 432 may include a third computational module 412, a fourth computational module 414, and/or other computational module. In some implementations, third computational module 412 and fourth computational module 414 may have the same input format requirement(s). Third computational module 412 may define a third set of operations to be performed on input to third computational module 412. Fourth computational module 412 may define a fourth set of operations to be performed on input to fourth computational module 414.

Input information set 402 (labelled as 'D') may be obtained and/or selected by a user. In some implementations, input information set 402 may satisfy the input format requirements of first computational module 404 and/or second computational module 406. Input information set 402 may be provided as module input for first workflow stage 430 for processing to produce first stage output. Processing input information set 402 may include providing the input information set 402 as module input to the first computational module 404 and the second computational module 406. At the first workflow stage, the first set of operations and the second set of operations may be performed on the input information set 402 and/or information derived from input information set 402. Performing the first set of operations on input information set 402 (i.e., processing input information set 402 through the first computational module 404) may produce first module output 408 (labelled as 'D$_1$'). Performing the second set of operations on input information set 402 may produce second module output 410 (labelled as 'D$_2$'). In some implementations, first module output 408 and/or second module output 410 may be generated simultaneously and/or near simultaneously.

Processing of input information set 402 at the first workflow stage 430 may generate first stage output. First stage output may include first module output 408, second module output 410, and/or other module outputs. In some implementations, the first module output 408 and the second module output 410 may satisfy the input requirements of the third computational module 412 and/or the fourth computational module 414. The first stage output may be provided as module input to the computational modules of the second workflow stage 432. At the second workflow stage 432, first stage output may be provided as module input for second workflow stage 432 for processing to produce second stage output. Processing first stage output may include providing first module output 408 and second module output 410 to both the third computational module 412 and the fourth computational module 414. At the second workflow stage, the third set of operations may be performed on the first module output 408 to produce third module output 416 (labelled as 'D$_3$'). The third set of operations may be performed on the second module output 410 to produce fourth module output 420 (labelled as 'D$_4$'). The fourth set operations may be performed on the first module output 408 to produce the fifth module output 422 (labelled as 'D$_5$'). The fourth set of operations may be performed on the second module output 410 to produce the sixth module output (labelled as 'D$_6$'). The second stage output may include third module output 416, fourth module output 420, fifth module output 422, sixth module output 424, and/or other module outputs.

Figure 5:
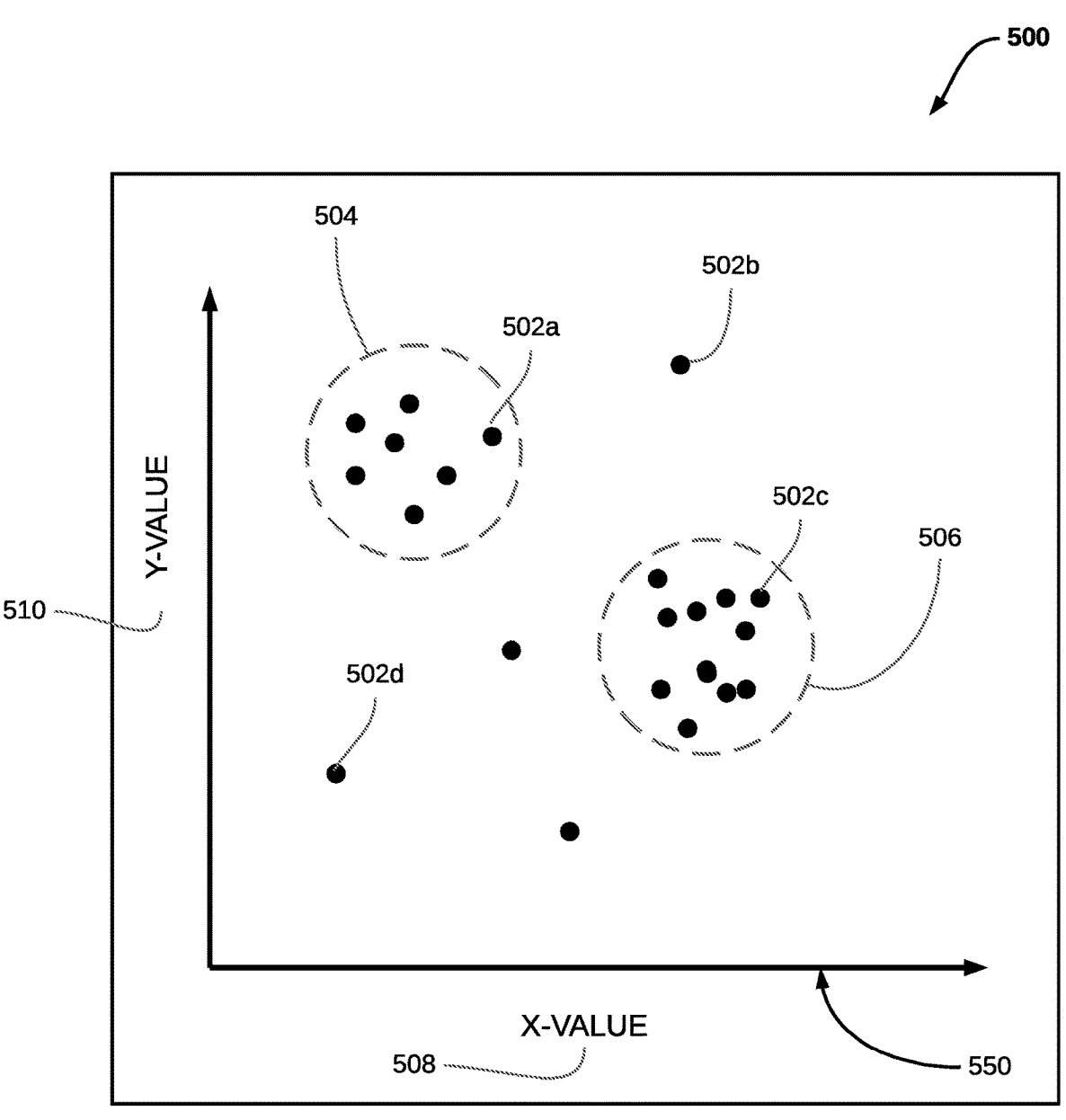
FIG. 5 illustrates an exemplary implementation of the system for training a machine learning model to determine confidence values for potential workflow outputs generated by a computational workflow and/or determining confidence values for potential workflow outputs using a trained machine learning model, in accordance with one or more implementations.

FIG. 5 shows an exemplary user interface 500 that may be used by system 100, in accordance with one or more implementations. User interface 500 may display a graphical summary 550 of a set of potential workflow outputs for an input information set. Individual ones of the potential workflow outputs may be represented by a plot 502a-d on graphical summary 550. It should be noted that while graphical summary 550 is shown as a scatterplot, this is not intended to be limiting. Graphical summary 550 may include the plots 502a-d representing individual potential workflow outputs of the set of potential workflow outputs based on one or more values of features and/or confidence values associated with the individual potential workflow outputs. For example, a first value of a first feature 508 (represented by "X-VALUE") and a second value of a second feature 510 (represented by "Y-VALUE) may determine the position for an individual plot 502a-d on graphical summary 550. In some implementations, graphical summary 550 may include one or more indications of clusters. For example, a first cluster indicator 504 (shown as a dashed circle) may indicate a first cluster of potential workflow outputs having similar values for the first feature 508 and/or similar values for the second feature 510. A second cluster indicator 506 (shown as a dashed circle) may indicate a second cluster of potential workflow outputs having similar values for the first feature 508 and/or similar values for the second feature 510. In some implementations, potential workflow outputs of the same cluster may have the same or similar confidence values. Individual plots 502a-d representing individual ones of the potential workflow outputs may be selectable via graphical summary 550.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

FIG. 2 illustrates a method 200 for training a machine learning model to determine confidence values for potential workflow outputs generated by a computational workflow, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing a workflow definition defining a computational workflow, computational modules, final workflow outputs, sets of potential workflow outputs, and/or other information. The workflow definition may specify a relative order of computational modules and/or sets of computational modules to configure the computational workflow. The computational modules may define separate sets of operations to perform on module inputs to the computational modules to generate module outputs. An individual set of potential workflow outputs may be generated by processing an input information set in accordance with the workflow definition. An individual final workflow output may be selected from the individual set of potential workflow outputs. By way of non-limiting illustration, a given final workflow output for a given input information set may be selected from a given set of potential workflow outputs for the given input information set. Operation 202 may be performed by electronic storage that is the same as or similar to electronic storage 128, in accordance with one or more implementations.

An operation 204 may include obtaining the sets of potential workflow outputs and final workflow outputs for multiple ones of the input information sets. By way of non-limiting illustration, the given set of potential workflow outputs and the given final workflow output for the given input information set may be obtained. Operation 204 may be performed by one or more hardware processors configured by machine-readable instructions including a component that is the same as or similar to machine learning component 108, in accordance with one or more implementations.

An operation 206 may include compiling the sets of potential workflow outputs and final workflow outputs into input/output pairs for the corresponding input information sets. The input/output pairs may include a first input/output pair having training input information, training output information, and/or other information. The training input information for the given input information set may include the given set of potential workflow outputs and/or other information. The training output information for the given input information set may include the given final workflow output selected from the given set of potential workflow outputs and/or other information. Operation 206 may be performed by one or more hardware processors configured by machine-readable instructions including a component that is the same as or similar to machine learning component 108, in accordance with one or more implementations.

An operation 208 may include training a machine learning model based on the input/output pairs for the multiple input information sets to generate a trained machine learning model and/or other information. The trained machine learning model may be configured to determine confidence values that represent likelihoods that the individual potential workflow outputs are the final workflow outputs. By way of non-limiting illustration, the machine learning model may be trained using the first input/output pair. Operation 208 may be performed by one or more hardware processors configured by machine-readable instructions including a component that is the same as or similar to machine learning component 108, in accordance with one or more implementations.

An operation 210 may include storing the trained machine learning model. Operation 210 may be performed by one or more hardware processors configured by machine-readable instructions including a component that is the same as or similar to machine learning component 108, in accordance with one or more implementations.

Figure 3:
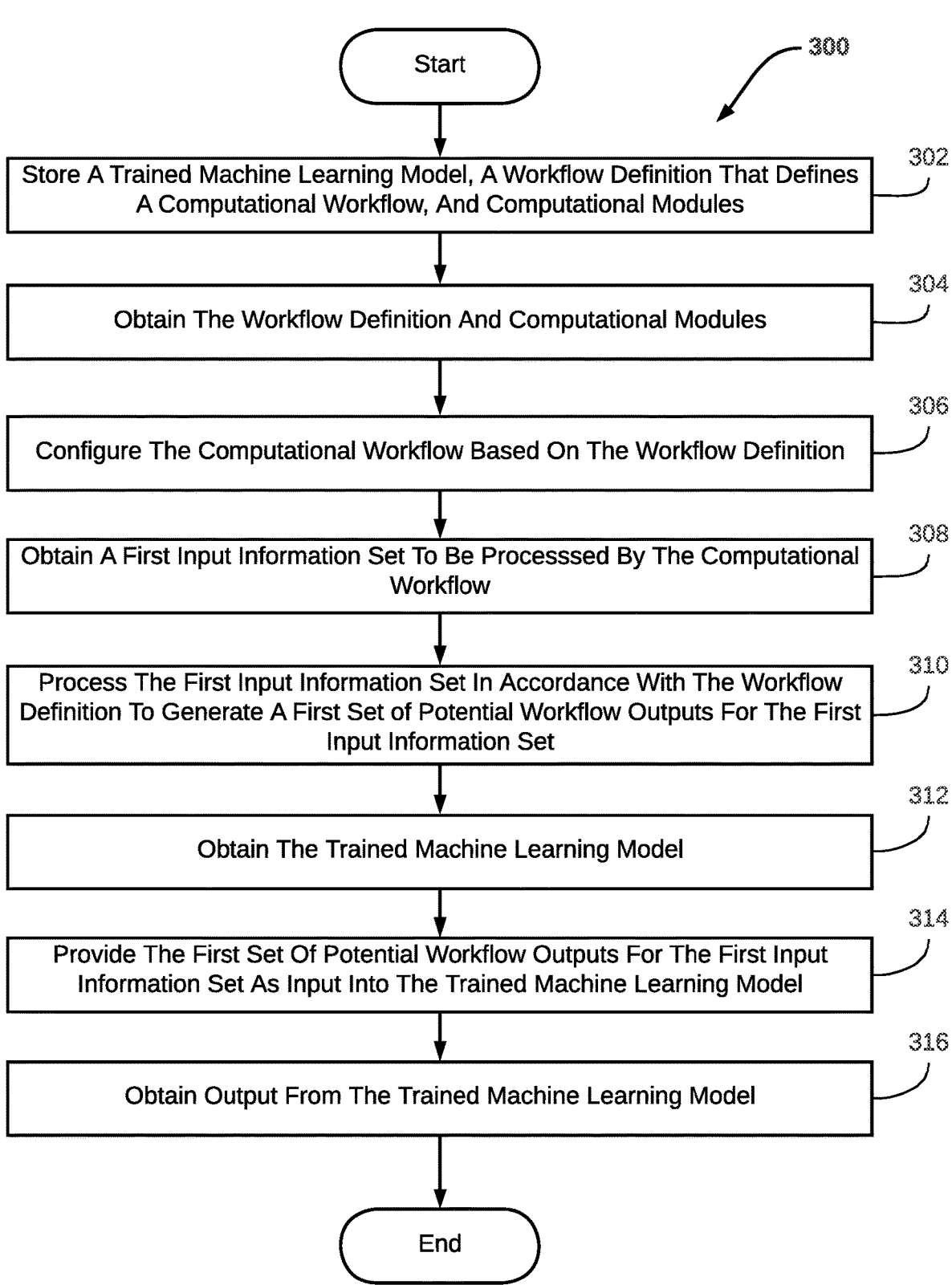
FIG. 3 illustrates a method for utilizing a trained machine learning model to determine confidence values for potential workflow outputs generated by a computational workflow, in accordance with one or more implementations.

FIG. 3 illustrates a method 300 for utilizing a trained machine learning model to determine confidence values for potential workflow outputs generated by a computational workflow, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include storing a trained machine learning model, a workflow definition that defines a computational workflow, computational modules, and/or other information. The trained machine learning model may be configured to determine confidence values that represent likelihoods that individual potential workflow outputs are the final workflow outputs. The workflow definition may specify a first set of computational modules followed by a second set of computational modules within the computational workflow. The computational modules may define separate sets of operations to perform on module inputs to the computational modules to generate module outputs. An individual set of potential workflow outputs may be generated by processing an input information set in accordance with the workflow definition. Operation 302 may be performed by electronic storage that is the same as or similar to electronic storage 128, in accordance with one or more implementations.

An operation 304 may include obtaining the workflow definition and computational modules. Operation 304 may be performed by one or more hardware processors configured by machine-readable instructions including a component that is the same as or similar to input component 110, in accordance with one or more implementations.

An operation 306 may include configuring the computational workflow based on the workflow definition. The computational workflow may have a first workflow stage and a second workflow stage that is subsequent to the first workflow stage. The first workflow stage may correspond to a first set of computational modules and the second workflow stage may correspond to a second set of computational modules. Operation 306 may be performed by one or more hardware processors configured by machine-readable instructions including a component that is the same as or similar to input component 110, in accordance with one or more implementations.

An operation 308 may include obtaining a first input information set to be processed by the computational workflow. Operation 308 may be performed by one or more hardware processors configured by machine-readable instructions including a component that is the same as or similar to input component 110, in accordance with one or more implementations.

An operation 310 may include processing the first input information set in accordance with the workflow definition to generate a first set of potential workflow outputs for the first input information set. At the first workflow stage, the first input information set may be provided as module input to individual ones of the computational modules of the first set of computational modules to generate a first set of module outputs. The first set of module outputs may include multiple module outputs generated by the individual computational modules of the first set of computational modules. At the second workflow stage, individual ones of the module outputs of the first set of module outputs may be provided as module inputs to individual ones of the computational modules of the second set of computational modules to generate a second set of module outputs. The second set of module outputs may include multiple module outputs generated by the individual computational modules of the second set of computational modules. The first set of potential workflow outputs may include the second set of module outputs and/or information derived thereof. Operation 310 may be performed by one or more hardware processors configured by machine-readable instructions including a component that is the same as or similar to workflow component 112, in accordance with one or more implementations.

An operation 312 may include obtaining the trained machine learning model. Operation 312 may be performed by one or more hardware processors configured by machine-readable instructions including a component that is the same as or similar to model component 114, in accordance with one or more implementations.

An operation 314 may include providing the first set of potential workflow outputs for the first input information set as input into the trained machine learning model. Operation 314 may be performed by one or more hardware processors configured by machine-readable instructions including a component that is the same as or similar to model component 114, in accordance with one or more implementations.

An operation 316 may include obtaining output from the trained machine learning model. Output from the trained machine learning model may include confidence values for individual potential workflow outputs of the first set of potential workflow outputs, and/or other information. The confidence values may represent likelihoods that the individual potential workflow outputs are the final workflow outputs for the first input information set. Operation 316 may be performed by one or more hardware processors configured by machine-readable instructions including a component that is the same as or similar to model component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to train machine learning model to determine confidence values for potential workflow outputs generated by computational workflows, the system comprising:

electronic storage that stores a workflow definition, computational modules, final workflow outputs, and sets of potential workflow outputs, wherein the workflow definition specifies a relative order of computational modules and/or sets of computational modules to configure a computational workflow, wherein the computational modules define separate sets of operations to perform on module inputs to the computational modules to generate module outputs, wherein an individual set of potential workflow outputs is generated by processing an input information set in accordance with the computational workflow, wherein an individual final workflow output is selected from the individual set of potential workflow outputs, such that a given final workflow output for a given input information set is selected from a given set of potential workflow outputs for the given input information set;

one or more physical processors configured by machine-readable instructions to:

obtain the sets of potential workflow outputs and final workflow outputs for multiple ones of the input information sets from electronic storage, such that the given set of potential workflow outputs and the given final workflow output for the given input information set are obtained, wherein individual ones of the given set of potential workflow outputs are functionally analogous;

compile the sets of potential workflow outputs and final workflow outputs into input/output pairs for the corresponding input information sets, wherein the input/output pairs include a first input/output pair having training input information and training output information, wherein the training input information for the given input information set includes the given set of potential workflow outputs, and wherein the training output information for the given input information set includes the given final workflow output selected from the given set of potential workflow outputs;

train a machine learning model based on the input/output pairs for the multiple input information sets to generate a trained machine learning model, wherein the trained machine learning model is configured to determine confidence values that represent likelihoods that the individual potential workflow outputs are selected as or will be selected as the final workflow output, such that the machine learning model is trained using the first input/output pair, wherein the confidence values include numeric values, levels, ranges, and/or other types of representing value, wherein the individual potential workflow outputs are characterized by one or more features, wherein the one or more features are represented by one or more scores for at least one of quality, accuracy, and/or precision of the individual potential workflow outputs, and wherein the confidence values are based on the one or more scores; and store the trained machine learning model in electronic storage.

2. The system of claim 1, wherein individual potential workflow outputs of the given set of potential workflow outputs include representations of nucleotide sequences and/or information related to the nucleotide sequences.

3. The system of claim 1, wherein user input from a user specifies selection of the given final workflow output from the given set of potential workflow outputs.

4. The system of claim 1, wherein a relatively higher confidence value indicates that the potential workflow output is more likely to be the final workflow output for the corresponding input information set.

5. A method for training machine learning models to determine confidence values for potential workflow outputs generated by computational workflows, the method comprising:

storing a workflow definition, computational modules, final workflow outputs, and sets of potential workflow outputs, wherein the workflow definition specifies a relative order of computational modules and/or sets of computational modules to configure a computational workflow, wherein the computational modules define separate sets of operations to perform on module inputs to the computational modules to generate module outputs, wherein an individual set of potential workflow outputs is generated by processing an input information set in accordance with the computational workflow, wherein an individual final workflow output for an input information set is selected from the individual set of potential workflow outputs, such that a given final workflow output for a given input information set is selected from a given set of potential workflow outputs for the given input information set;

obtaining the sets of potential workflow outputs and final workflow outputs for multiple ones of the input information sets, including obtaining the given set of potential workflow outputs and the given final workflow output for the given input information set, wherein individual ones of the given set of potential workflow outputs are functionally analogous;

compiling the sets of potential workflow outputs and final workflow outputs into input/output pairs for the corresponding input information sets, wherein the input/output pairs include a first input/output pair having training input information and training output information, wherein the training input information for the given input information set includes the given set of potential workflow outputs, and wherein the training output information for the given input information set includes the given final workflow output selected from given set of potential workflow outputs;

training a machine learning model based on the input/output pairs for the multiple input information sets to generate a trained machine learning model, wherein the trained machine learning model is configured to determine confidence values that represent likelihoods that the individual potential workflow outputs are selected as or will be selected as the final workflow output, such that the machine learning model is trained using the first input/output pair, wherein the confidence values include numeric values, levels, ranges, and/or other types of representing value, wherein the individual potential workflow outputs are characterized by one or more features, wherein the one or more features are represented by one or more scores for at least one of quality, accuracy, and/or precision of the individual potential workflow outputs, and wherein the confidence values are based on the one or more scores; and storing the trained machine learning model.

6. The method of claim 5, wherein individual potential workflow outputs of the given set of potential workflow outputs include representations of nucleotide sequences and/or information related to the nucleotide sequences.

7. The method of claim 5, wherein user input from a user specifies selection of the given final workflow output from the given set of potential workflow outputs.

8. The method of claim 5, wherein a relatively higher confidence value indicates that the potential workflow output is more likely to be the final workflow output for the corresponding input information set.

\* \* \* \* \*